(12) United States Patent
Chu

(10) Patent No.: US 6,437,474 B1
(45) Date of Patent: Aug. 20, 2002

(54) ROTOR OF SYNCHRONOUS MOTOR

(76) Inventor: Ming Tsong Chu, No. 108-24, Chong Chin Road, Bei Tun Chu, Taichung (TW), 406

(*) Notice: Subject to any disclaimer, the term of this patent is extended or adjusted under 35 U.S.C. 154(b) by 0 days.

(21) Appl. No.: 09/547,379

(22) Filed: Apr. 11, 2000

(51) Int. Cl.⁷ .................................. H02K 21/12
(52) U.S. Cl. ...................... 310/156.53; 310/156.51; 310/261; 29/598
(58) Field of Search .............. 310/156.51, 156.22, 310/162, 261, 217, 156.53, 156.57, 156.49, 218; 29/598

(56) References Cited

U.S. PATENT DOCUMENTS

| | | | | |
|---|---|---|---|---|
| 2,059,518 A | * | 11/1936 | Harley | 310/156.53 |
| 4,472,651 A | * | 9/1984 | Jones | 310/156.78 |
| 4,525,925 A | * | 7/1985 | Jones | 310/156.78 |
| 4,631,807 A | | 12/1986 | Kawada et al. | 29/598 |
| 5,010,266 A | | 4/1991 | Uchida | 310/156.22 |
| 5,140,211 A | | 8/1992 | Ucida | 310/156.61 |
| 5,157,297 A | | 10/1992 | Ucida | 310/156.61 |
| 5,191,256 A | * | 3/1993 | Reite, Jr. et al. | 310/156.49 |
| 5,363,004 A | * | 11/1994 | Futami et al. | 310/156.53 |
| 5,463,262 A | | 10/1995 | Ucida | 310/156.61 |
| 5,581,140 A | * | 12/1996 | Futami et al. | 310/156.53 |
| 5,679,995 A | * | 10/1997 | Nagate et al. | 310/156.54 |
| 5,952,755 A | * | 9/1999 | Lubas | 310/156.19 |
| 6,005,318 A | * | 12/1999 | Pop, Sr. | 310/156.57 |
| 6,008,559 A | * | 12/1999 | Asano et al. | 310/156.53 |

* cited by examiner

*Primary Examiner*—Joseph Waks

(57) ABSTRACT

A rotor for a synchronous motor includes two end plates and a number of laminated core members engaged on a shaft and secured together with a single fastener. The laminated core members have a number of radially arranged apertures for receiving a number of permanent magnets. One of the end plates has a number of inner ribs engaged into the apertures of the laminated core members and the other end plate has a number of inner cavities for receiving one ends of the permanent magnets such that the elements may be quickly secured together with the single fastener.

5 Claims, 4 Drawing Sheets

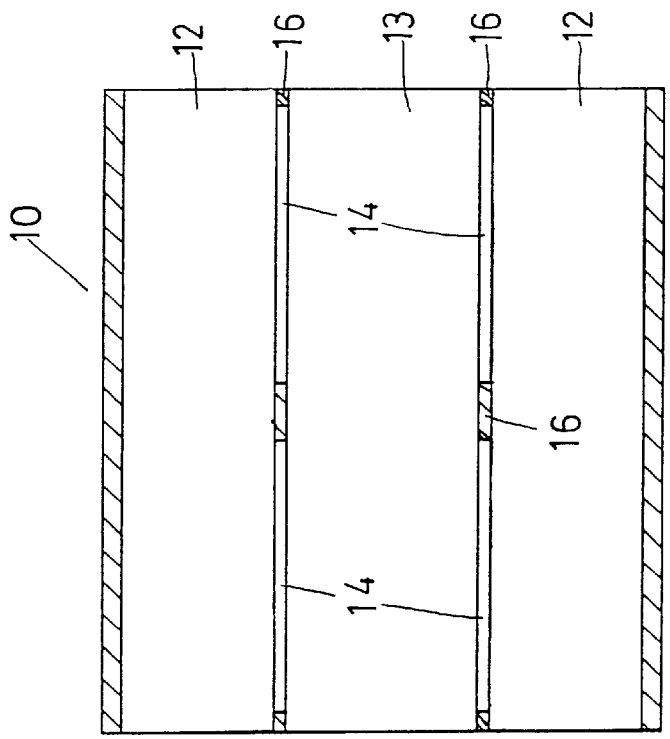
FIG. 3
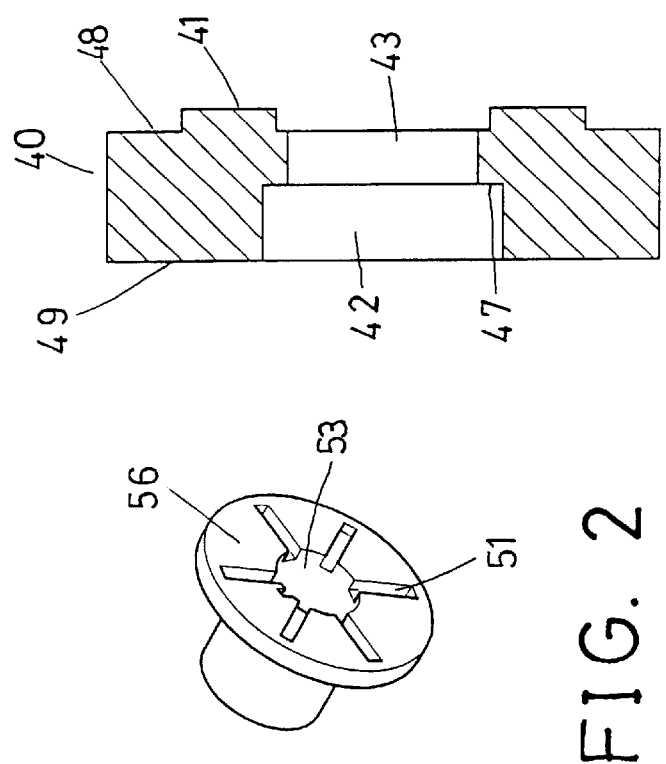
FIG. 4
FIG. 2

ROTOR OF SYNCHRONOUS MOTOR

BACKGROUND OF THE INVENTION

1. Field of the Invention

The present invention relates to a rotor, and more particularly to a rotor of a synchronous motor.

2. Description of the Prior Art

Typical rotors are rotatably provided in a stator or are rotatably engaged on a stator of a synchronous motor. U.S. Pat. No. 4,631,807 to Kawada et al, U.S. Pat. No. 5,010,266 to Uchida, U.S. Pat. No. 5,140,211 to Ucida, U.S. Pat. No. 5,157,297 to Uchida, and U.S. Pat. No. 5,463,262 to Uchida disclose several arts of the rotor, and include a number of laminated core members arranged around a rotating shaft, and a number of permanent magnets radially arranged around the rotating shaft and engaged in the laminated core members. The laminated core members are secured together by two end plates and by six or more screw fasteners which include the ends that are extended outward through the laminated core members and the end plates. The ends of the fasteners that are extended outward through the end plates may affect the operation of the rotor. In addition, it takes a long time to thread and to secure the screw fasteners together. Furthermore, the laminated core members of some of the synchronous motor are separated from each other and are required to be assembled together during the assembling operation. The precisions of the outer peripheral portions of the laminated core members thus may not be easily controlled.

The present invention has arisen to mitigate and/or obviate the afore-described disadvantages of the conventional rotors.

SUMMARY OF THE INVENTION

The primary objective of the present invention is to provide a rotor of a synchronous motor having a number of laminated core members secured together by fasteners that are not extended outward through the end plates.

In accordance with one aspect of the invention, there is provided a rotor for a synchronous motor comprising a shaft including a first end portion having a peripheral shoulder provided thereon and including a second end portion, a first end plate engaged on the shaft and engaged with the peripheral shoulder of the shaft, the first end plate including an inner surface having a plurality of ribs extended therefrom, a plurality of laminated core members engaged on the shaft and engaged with the inner surface of the first end plate, the laminated core members including a plurality of radially arranged apertures formed therein for receiving the ribs of the first end plate, a plurality of permanent magnets received in the apertures of the laminated core members, and including a first end engaged with the ribs of the first end plate, and including a second end extended outward of the laminated core members. a second end plate engaged on the shaft and engaged with the laminated core members, the second end plate including an inner surface having a plurality of cavities formed therein for receiving the second end of the laminated core members, the second end plate including an outer portion, and a fastener engaged onto the second end portion of the shaft and engaged with the outer portion of the second end plate for securing the first end plate and the second end plate and the laminated core members on the shaft. The end plates and the laminated core members may be easily and quickly engaged onto the shaft and may be easily and quickly secured on the shaft with the single fastener.

A securing device is further provided for securing the second end plate to the shaft and includes at least one key engaged between the second end plate and the shaft for securing the second end plate to the shaft and for preventing the second end plate from rotating relative to the shaft. The second end portion of the shaft includes an outer thread formed thereon and threaded with the fastener for allowing the end plates and the laminated core members to be easily and quickly secured on the shaft with the single fastener.

The shaft includes at least one annular recess formed therein, the laminated core members include slot formed therein and defined by at least two coupling elements. the slot of the laminated core members is aligned with the annular recess of the shaft.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a perspective view of an end plate;

FIG. 3 is a cross sectional view taken along lines 3—3 of FIG. 1;

FIG. 4 is a cross sectional view taken along lines 4—4 of FIG. 1;

DETAILED DESCRIPTION OF THE PREFERRED EMBODIMENT

Figure 1:
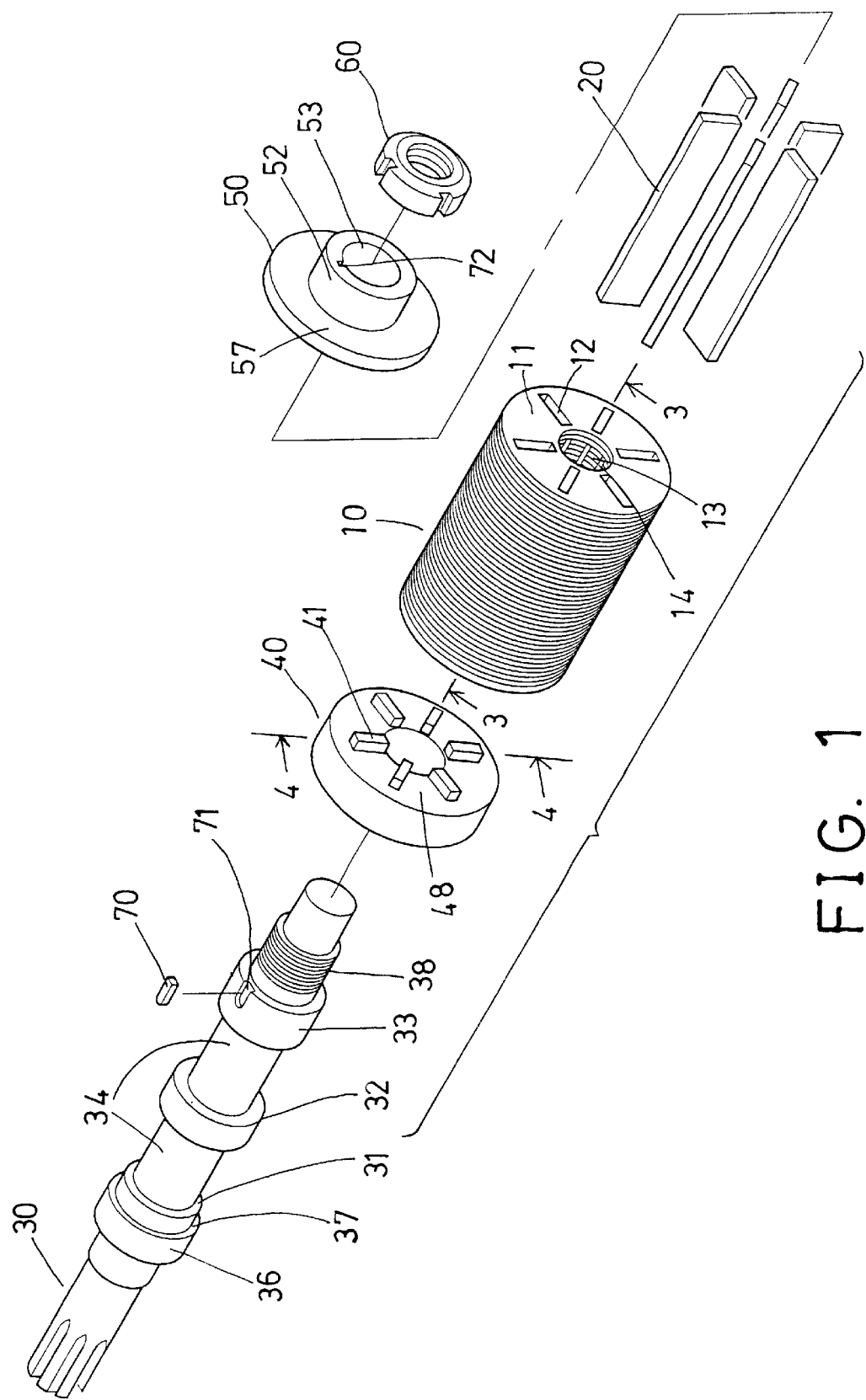
FIG. 1 is an exploded view of a rotor in accordance with the present invention.

Referring to the drawings, and initially to FIGS. 1–7, a rotor in accordance with the present invention is provided for a synchronous motor and comprises a number of laminated core members 10 arranged around a shaft 30. The laminated core members 10 may be secured together by adhesive materials or the like, and include a bore 13 formed therein for receiving the shaft 30, and include a number of apertures 12 formed therein and radially arranged around the bore 13 thereof for receiving the permanent magnets 20, such that the permanent magnets 20 may be engaged in the laminated core members 10 and radially arranged around the shaft 30, and such that the laminated core members 10 and the permanent magnets 20 form an integral member. The laminated core members 10 include a number of slots 14 formed therein (FIGS. 1, 3, 5) and defined by a number of coupling elements 16.

The shaft 30 includes two or more annular bulges 31, 32, 33 formed on the middle portion thereof for defining one or more annular recesses 34, and includes an annular protrusion 36 formed around one of the annular bulges 31, which is provided on or closed to one end of the shaft 30, for defining an annular or peripheral shoulder 37 between the annular protrusion 36 and the annular bulge 31. The shaft 30 includes an outer thread 38 formed thereon and close to the other end thereof or formed on the other end thereof for threading with a fastener 60.

Figure 5:
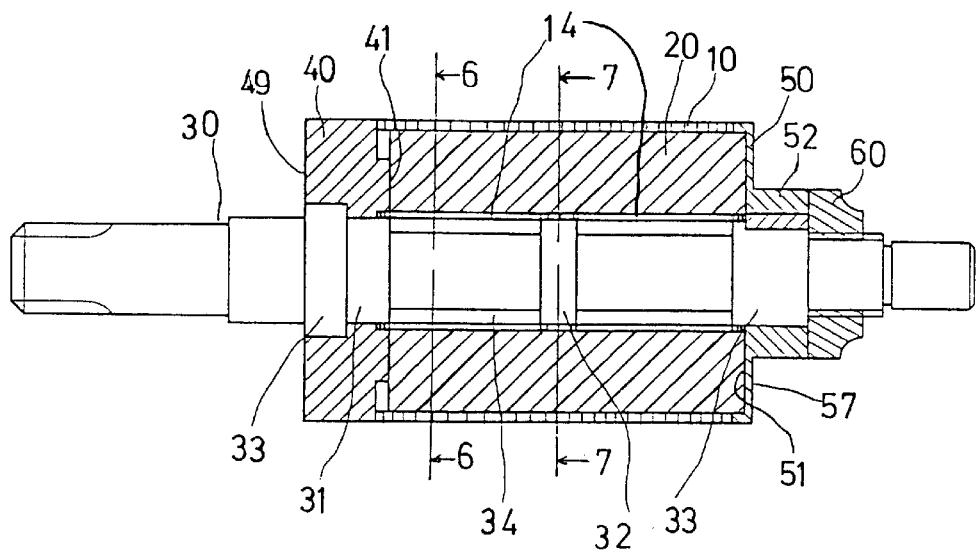
FIG. 5 is a cross sectional view taken along lines 5—5 of FIG. 6.

An end plate 40 includes a stepped hole or includes two orifices 42, 43 of different diameters for defining an annular shoulder 47 therein and for engaging with the annular shoulder 37 of the shaft 30 for limiting the end plate 40 to move relative to the shaft 30 and for preventing the end plate 40 from being disengaged from the shaft 30. The orifice 42 of the end plate 40 includes a greater diameter for receiving the annular protrusion 36 of the shaft 30, and the other orifice 43 of the end plate 40 includes a diameter smaller than the of the orifice 42 of the end plate 40 for receiving the annular bulge 31 of the shaft 30. The end plate 40 includes a number of ribs 41 radially extended from the inner surface 48 thereof and engaged into the apertures 12 of the laminated core members 10 and contacted with the permanent magnets 20 (FIG. 5). The end plate 40 includes a flat and smooth outer surface 49 (FIGS. 4, 5, 8, 9).

Another end plate 50 includes a bore 53 formed therein for receiving the shaft 30 and includes a number of cavities 51 (FIG. 2) formed in the inner surface 56 thereof and arranged radially around the shaft 30 for receiving the ends of the permanent magnets 20. The end plate 50 includes an annular barrel 52 extended outward from the outer surface or the outer portion 57 thereof and engaged with the fastener 60 which may solidly secure the laminated core members 10 and the end plates 40, 50 on the shaft 30. One or more keys 70 are engaged in the depressions 71, 72 of the shaft 30 and the end plate 50 for keying the shaft 30 and the end plate 50 and thus the laminated core members 10 and the end plate 40 together.

As best shown in FIG. 5, the end plates 40, 50 and the laminated core members 10 may be easily and quickly engaged onto the shaft 30, and may be easily and quickly secured together with the single fastener 60. The elements of the typical rotors are required to be secured together by twelve threaded fasteners, such that the typical rotors may not be quickly assembled.

As shown in FIGS. 3, 5–7, the coupling elements 16 of the laminated core members 10 are preferably arranged and disposed according to and aligned with the annular bulges 31, 32, 33 of the shaft 30, and the annular recesses 34 of the shaft 30 are aligned with the slots 14 of the laminated core members 10.

Figure 8:
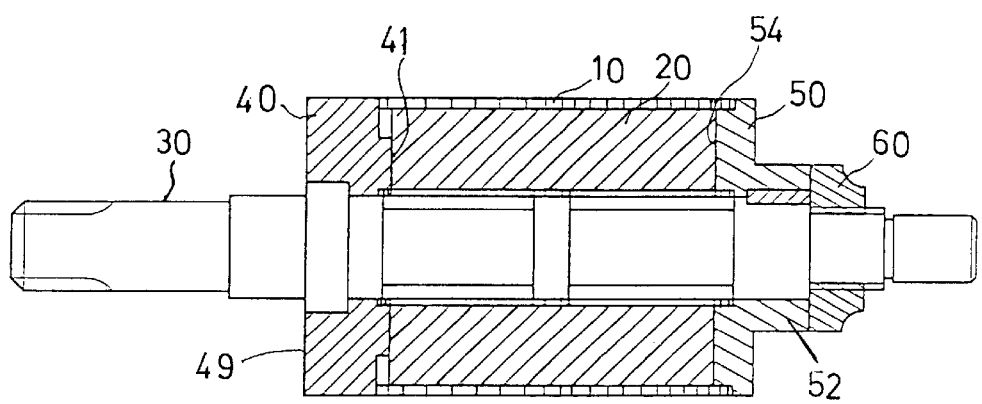
FIGS. 8 and 9 are cross sectional views similar to FIG. 5, illustrating the other applications of the rotor.

Referring next to FIG. 8, alternatively, the other the end plate 50 may also include a number radially extended ribs 54 extended from the inner surface 56 thereof and engaged into the apertures 12 of the laminated core members 10 and contacted with the permanent magnets 20, such that the end plates 40, 50 and the laminated core members 10 may also be easily and quickly engaged onto the shaft 30, and may also be easily and quickly secured together with the single fastener 60.

Figure 9:
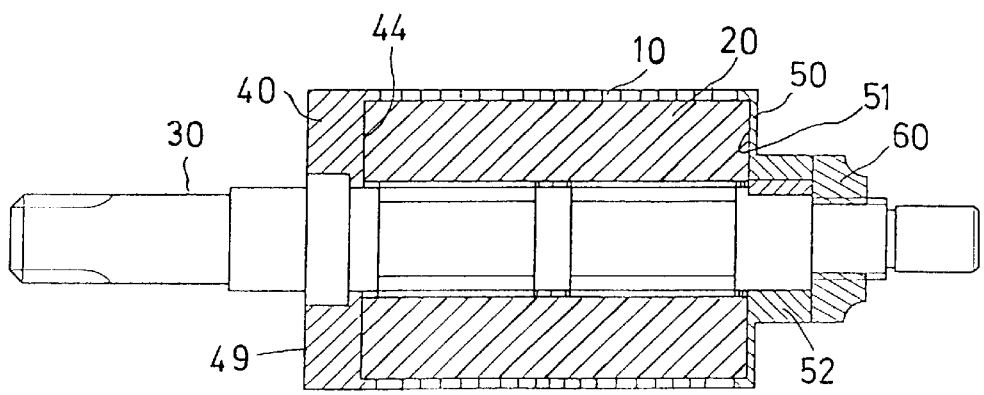
Figure 6:
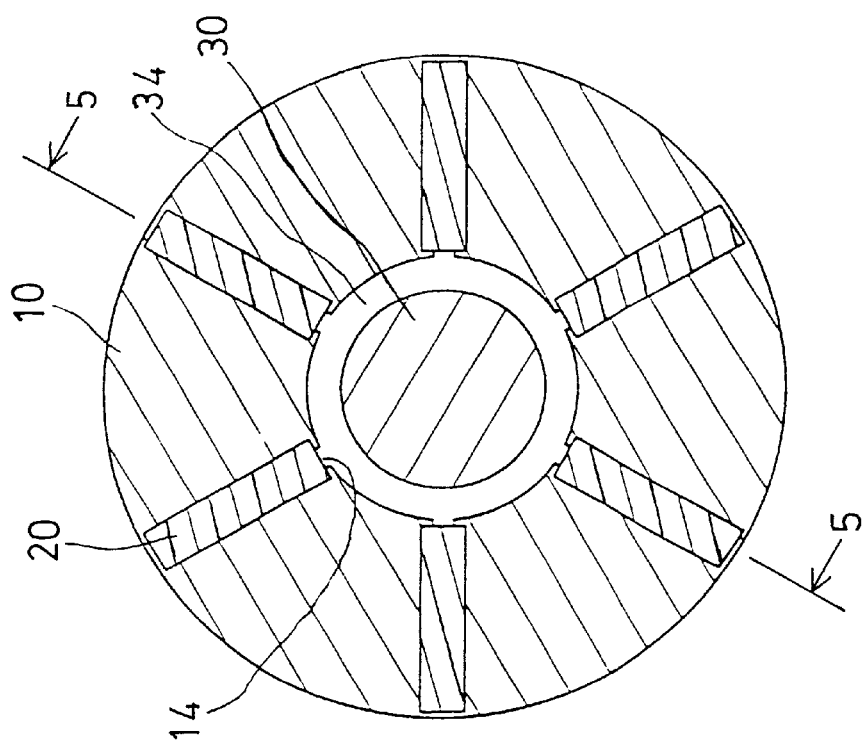
FIGS. 6 and 7 are cross sectional views taken along lines 6—6 and 7—7 of FIG. 5 respectively.
Figure 7:
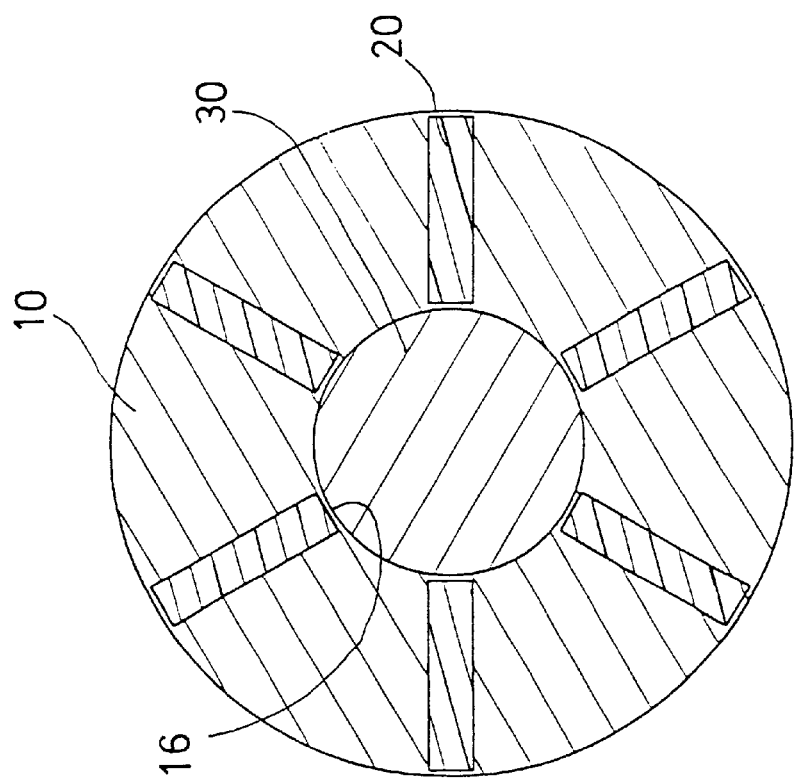

Referring next to FIG. 9, further alternatively, the end plate 40 may also include a number radially arranged cavities 44 formed in the inner surface 48 thereof for receiving the ends of the permanent magnets 20, such that the end plates 40, 50 and the laminated core members 10 may also be easily and quickly engaged onto the shaft 30, and may also be easily and quickly secured together with the single fastener 60.

Accordingly, the rotor of the synchronous motor in accordance with the present invention includes a number of laminated core members secured together by a fastener device that is not extended outward through the end plates.

In addition, the laminated core members may be easily and quickly and solidly secured together with the single fastener. Furthermore, the laminated core members are solidly secured together such that the precisions of the outer peripheral portions of the laminated core members may be easily controlled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A rotor for a synchronous motor comprising:

a shaft including a first end portion having a peripheral shoulder provided thereon and including a second end portion, a first end plate engaged on said shaft and engaged with said peripheral shoulder of said shaft, said first end plate including an inner surface having a plurality of ribs extended therefrom, a plurality of laminated core members engaged on said shaft and engaged with said inner surface of said first end plate, said laminated core members including a plurality of radially arranged apertures formed therein for receiving said ribs of said first end plate, a plurality of permanent magnets received in said apertures of said laminated core members, and including a first end engaged with said ribs of said first end plate, and including a second end extended outward of said laminated core members, a second end plate engaged on said shaft and engaged with said laminated core members, said second end plate including an inner surface having a plurality of cavities formed therein for receiving said second end of said laminated core members, said second end plate including an outer portion, and a fastener engaged onto said second end portion of said shaft and engaged with said outer portion of said second end plate for securing said first end plate and said second end plate and said laminated core members on said shaft.

2. The rotor according to claim 1 further comprising means for securing said second end plate to said shaft.

3. The rotor according to claim 2, wherein said securing means includes at least one key engaged between said second end plate and said shaft for securing said second end plate to said shaft.

4. The rotor according to claim 1, wherein said second end portion of said shaft includes an outer thread formed thereon and threaded with said fastener.

5. The rotor according to claim 1, wherein said shaft includes at least one annular recess formed therein, said laminated core members include at least one slot formed therein and defined by at least two coupling elements, said at least one slot of said laminated core members is aligned with said at least one annular recess of said shaft.

* * * * *